US012634597B2

(12) United States Patent
Yamamoto

(10) Patent No.: US 12,634,597 B2
(45) Date of Patent: May 19, 2026

(54) SAMPLE OBSERVATION DEVICE AND SAMPLE OBSERVATION METHOD

(71) Applicant: HAMAMATSU PHOTONICS K.K., Hamamatsu (JP)

(72) Inventor: Satoshi Yamamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 18/382,165

(22) Filed: Oct. 20, 2023

(65) Prior Publication Data

US 2024/0214702 A1 Jun. 27, 2024

(30) Foreign Application Priority Data

Dec. 27, 2022 (JP) ................................. 2022-209709

(51) Int. Cl.
*H04N 25/531* (2023.01)
*H04N 23/56* (2023.01)
*H04N 23/76* (2023.01)

(52) U.S. Cl.
CPC ........... *H04N 25/531* (2023.01); *H04N 23/56* (2023.01); *H04N 23/76* (2023.01)

(58) Field of Classification Search
CPC ....... H04N 25/531; H04N 23/76; H04N 23/56
USPC ........................................................ 348/370
See application file for complete search history.

(56) References Cited

U.S. PATENT DOCUMENTS

| | | | |
|---|---|---|---|
| 10,107,758 B2 | 10/2018 | Oldham et al. | |
| 2004/0218062 A1* | 11/2004 | Silverstein | H04N 23/81 |
| | | | 348/E5.037 |
| 2012/0033098 A1* | 2/2012 | Matsuyama | H04N 23/689 |
| | | | 348/222.1 |

(Continued)

FOREIGN PATENT DOCUMENTS

| | | | |
|---|---|---|---|
| JP | 2018-063292 A | 4/2018 | |
| JP | 2021-101241 A | 7/2021 | |
| WO | WO-2018084051 A1 * | 5/2018 | H04N 5/64 |

OTHER PUBLICATIONS

Yufen Sun et al, "Rolling shutter distortion removal based on curve interpolation", IEEE Transactions on Consumer Electronics, IEEE Service Center, New York, NY, US, vol. 58, No. 3,, Aug. 1, 2012, p. 1045-p. 1050, XP011465127.

(Continued)

*Primary Examiner* — Lin Ye
*Assistant Examiner* — Steven Daniel Barry
(74) *Attorney, Agent, or Firm* — Faegre Drinker Biddle & Reath LLP

(57) ABSTRACT

In a sample observation device, an image capturing unit includes an area image sensor that performs image capturing by the rolling shutter method in which a start of an exposure period of each of pixel columns in a pixel region is shifted by a predetermined time, and a generation unit sets one pixel column of the pixel columns as a reference pixel column, and combines a data portion corresponding to an exposure position of the reference pixel column in exposure positions of pixel columns of one frame and the data portion corresponding to an exposure position of the reference pixel column in exposure positions of pixel columns of other frames continuous to the one frame, thereby generating two-dimensional image data corresponding to the exposure position of the reference pixel column in the one frame.

8 Claims, 9 Drawing Sheets

(56)  References Cited

U.S. PATENT DOCUMENTS

2012/0127330 A1 * 5/2012 Masaoka .............. H04N 25/531
348/240.99
2014/0218569 A1 8/2014 Tsubaki
2018/0321481 A1 11/2018 Vartiainen et al.
2021/0088446 A1 * 3/2021 Sugiyama .............. G01N 21/51

OTHER PUBLICATIONS

Office Action dated Dec. 1, 2025 from counterpart EP patent application No. 23206666.2.

* cited by examiner

SAMPLE OBSERVATION DEVICE AND SAMPLE OBSERVATION METHOD

TECHNICAL FIELD

The present disclosure relates to a sample observation device and a sample observation method.

BACKGROUND

As a sample observation device, for example, a device described in Japanese Unexamined Patent Publication No. 2018-063292 is known. The sample observation device includes an irradiation optical system that irradiates a sample with a planar light, a scanning unit that scans the sample with respect to an irradiation surface of the planar light, and an imaging optical system that has an observation axis inclined with respect to the irradiation surface and images observation light generated in the sample by irradiation with planar light, an image acquiring unit that acquires a plurality of pieces of partial image data corresponding to a part of a light image of the observation light imaged by the imaging optical system, and an image generating unit that generates observation image data of the sample on the basis of the plurality of pieces of partial image data generated by the image generation unit.

SUMMARY

The above-described image acquiring unit of the sample observation device uses area image sensors such as a CMOS image sensor and a CCD image sensor. These area image sensors are arranged on an image-forming surface of the observation light formed by the imaging optical system, and capture an optical image of the observation light to generate two-dimensional image data. Examples of an image capturing method of the area image sensor include a global shutter method and a rolling shutter method.

The global shutter method is an image capturing method in which a start of an exposure period of each of pixel columns coincides with each other, and the rolling shutter method is an image capturing method in which a start of an exposure period of each of pixel columns is shifted by a predetermined time. In general, the rolling shutter method tends to have a higher frame rate than the global shutter method. Therefore, for the sample observation device whose the resolution of image data is affected by the number of frames during sample scanning, the rolling shutter method has been studied to be adopted.

However, in a case where the rolling shutter method is adopted as the image capturing method, it is conceivable that the exposure periods in the pixel columns are shifted due to the shift of the start of the exposure period in the pixel columns, and distortion occurs in the imaged figure of the sample in the image data acquired by scanning of the sample. The shift of the exposure period is a shift of the exposure position with respect to the sample according to the scanning speed. For this reason, depending on the shift amount, an imaged figure of the sample that should originally exist in one frame is recognized as an imaged figure of the sample existing in the adjacent frame, and there is a possibility that the analysis accuracy of a shape and an existing position of the sample is lowered.

The present disclosure has been made to solve the above problems, and an object of the present disclosure is to provide a sample observation device and a sample observation method capable of reducing distortion of an imaged figure of a sample in image data even in a case where capturing image by a rolling shutter method is adopted.

A sample observation device according to an aspect of the present disclosure includes an irradiation optical system configured to irradiate a sample with planar light, a scanning unit configured to scan the sample in a direction orthogonal to an irradiation surface of the planar light, an image capturing unit configured to include a pixel region for image capturing observation light generated in the sample by irradiation of the planar light to output image data based on a capturing result of the observation light in the pixel region, and a generation unit configured to generate two-dimensional image data at each position in a scanning direction of the sample on the basis of the image data, in which the image capturing unit includes an area image sensor that performs image capturing by a rolling shutter method in which a start of an exposure period of each of pixel columns in the pixel region is shifted by predetermined time, and the generation unit sets one pixel column of the pixel columns as a reference pixel column, and combines a data portion corresponding to an exposure position of the reference pixel column among exposure positions of pixel columns of one frame and a data portion corresponding to an exposure position of the reference pixel column among exposure positions of pixel columns of other frames continuous to the one frame, thereby generating two-dimensional image data corresponding to an exposure position of the reference pixel column in the one frame.

In this sample observation device, in generating two-dimensional image data of a sample, one pixel column of the pixel columns is set as a reference pixel column, and data portions corresponding to exposure positions of the reference pixel column are combined between consecutive frames. As a result, image data obtained by image capturing by the rolling shutter method is reconstructed into image data equivalent to image data obtained by the global shutter method, and distortion of an imaged figure of the sample in the image data can be reduced. By reducing the distortion of the imaged figure of the sample, it is possible to prevent the imaged figure of the sample of one frame from being recognized as the imaged figure of the sample of the adjacent frame, and it is possible to sufficiently ensure the analysis accuracy of the shape and the existing position of the sample.

The generation unit may set a pixel column to be an array end of the pixel region as a reference pixel column. In this case, the control required for generating the two-dimensional image data can be simplified.

The generation unit may set an intermediate pixel column of the pixel region as a reference pixel column. In this way, even when the sample is bidirectionally scanned, the measurement range can be made the same regardless of the scanning direction.

The generation unit may calculate a combination ratio of the data portions on the basis of roll time represented by a time difference of a start of an exposure period in each of the pixel columns, a scanning speed of the sample by the scanning unit, and resolution of the image capturing unit. The combining is optimized by calculating the combination ratio of the data portions in consideration of the scanning conditions and the image capturing conditions.

A sample observation method according to an aspect of the present disclosure includes the steps of: irradiating a sample with planar light; scanning the sample in a direction orthogonal to an irradiation surface of the planar light; image capturing by using a pixel region for image capturing observation light generated in the sample by irradiation of the planar light to output image data based on a capturing result of the observation light in the pixel region; and generating two-dimensional image data at each position in a scanning direction of the sample on the basis of the image data, in which the image capturing step uses an area image sensor that performs image capturing by a rolling shutter method in which a start of an exposure period of each of pixel columns in the pixel region is shifted by predetermined time, and the generating step sets one pixel column of the pixel columns as a reference pixel column, and combines a data portion corresponding to an exposure position of the reference pixel column among exposure positions of pixel columns of one frame and a data portion corresponding to an exposure position of the reference pixel column among exposure positions of pixel columns of other frames continuous to the one frame, thereby generating two-dimensional image data corresponding to an exposure position of the reference pixel column in the one frame.

In this sample observation method, in generating two-dimensional image data of the sample, one pixel column of the pixel columns is set as a reference pixel column, and data portions corresponding to exposure positions of the reference pixel column are combined between consecutive frames. As a result, image data obtained by image capturing by the rolling shutter method is reconstructed into image data equivalent to image data obtained by the global shutter method, and distortion of an imaged figure of the sample in the image data can be reduced. By reducing the distortion of the imaged figure of the sample, it is possible to prevent the imaged figure of the sample of one frame from being recognized as the imaged figure of the sample of the adjacent frame, and it is possible to sufficiently ensure the analysis accuracy of the shape and the existing position of the sample.

DETAILED DESCRIPTION

Hereinafter, preferred embodiments of a sample observation device and a sample observation method according to one aspect of the present disclosure will be described in detail with reference to the drawings.

Figure 1:
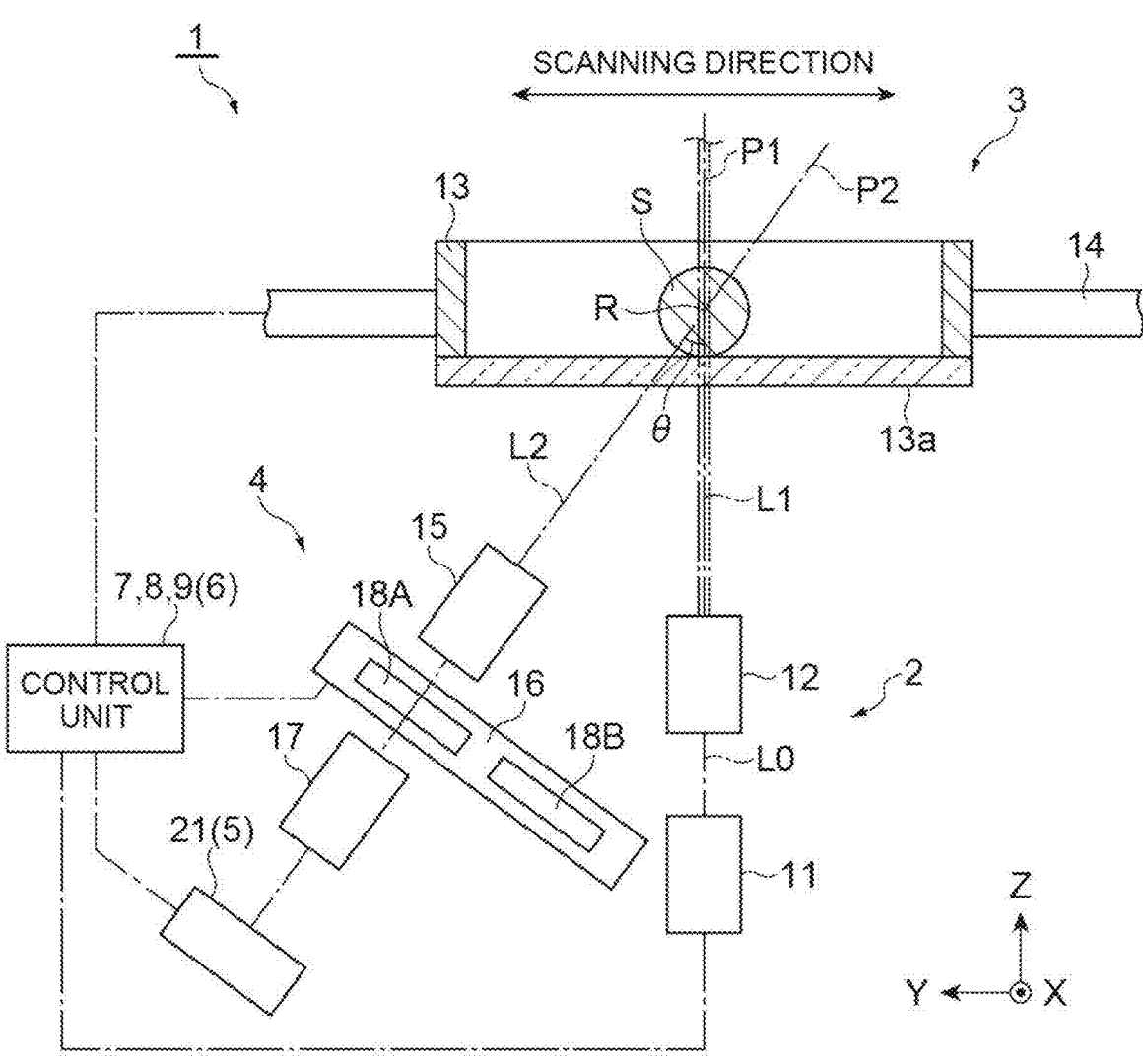
FIG. 1 is a schematic configuration diagram illustrating a sample observation device according to an embodiment of the present disclosure.

FIG. 1 is a schematic configuration diagram illustrating a sample observation device according to an embodiment of the present disclosure. A sample observation device 1 illustrated in FIG. 1 is configured as a device that irradiates a sample S with planar light L1 and captures fluorescence or scattered light generated inside the sample S to acquire observation image data inside the sample S.

Examples of the sample observation device 1 of this type include a slide scanner that acquires and displays an image of the sample S held on a slide glass, a plate reader that acquires image data of the sample S held on a microplate and analyzes the image data, and the like. Examples of the sample S to be observed include human or animal cells, tissues, organs, animals or plants themselves, and plant cells and tissues. In addition, the sample S may be contained in a solution, a gel, or a substance having a refractive index different from that of the sample S.

As illustrated in FIG. 1, the sample observation device 1 includes an irradiation optical system 2, a scanning unit 3, an imaging optical system 4, an image capturing unit 5, and a control unit 6. The irradiation optical system 2 is an optical system that irradiates the sample S with the planar light L1. The irradiation optical system 2 includes a light source 11 that outputs light L0 that is a generation source of the planar light L1, and a light shaping element 12 that shapes the light L0 into the planar light L1 and irradiates the sample S with the shaped planar light L1 along the optical axis P1.

Examples of the light source 11 include laser light sources such as laser diodes and solid-state laser light sources. The light source 11 may be a light emitting diode, a superluminescent diode, or a lamp-based light source. The light L0 output from the light source 11 is guided to the light shaping element 12.

Examples of the light shaping element 12 include a cylindrical lens, an axicon lens, a spatial light modulator, and the like. The light shaping element 12 may include an objective lens. The light shaping element 12 may include an objective scanner. In this case, the light shaping element 12 may optically scan the linear light L0 output from the light source 11 to form the planar light L1. In the sample S irradiated with the planar light L1 generated by the light shaping element 12, observation light L2 is generated on an irradiation surface R of the planar light L1. The observation light L2 is, for example, fluorescence excited by the planar light L1, scattered light of the planar light L1, or diffusely reflected light of the planar light L1.

A scanning unit 3 is a mechanism that scans the sample S with respect to the irradiation surface R of the planar light L1. The scanning unit 3 includes a container 13 that holds the sample S and a stage 14 that moves the container 13. The container 13 is, for example, a microplate, a slide glass, a petri dish, or the like. A bottom surface 13a of the container 13 is an input surface of the planar light L1. It is made of a transparent member having transparency to the planar light L1. Examples of the constituent material of the bottom surface 13a include glass, quartz, a rigid resin, and the like.

The stage 14 holds the container 13 and scans the container 13 in a preset direction. The stage 14 scans the container 13 in one direction in a plane orthogonal to the optical axis P1 of the planar light L1. In the present embodiment, the stage 14 may be a state performing bidirectional scanning. In the bidirectional scanning, the stage 14 scans the container 13 in a direction including a first direction and a second direction opposite to the first direction with respect to the irradiation surface R of the planar light L1.

In the following description, an orthogonal coordinate system including X, Y, and Z axes orthogonal to each other is used for convenience (see FIG. 1). In the present embodiment, a direction along the optical axis P1 of the planar light L1 is defined as a Z axis, a scanning direction of the container 13 by the stage 14 is defined as a Y axis, and a direction orthogonal to the Y axis in a plane orthogonal to the optical axis P1 of the planar light L1 is defined as an X axis.

In a case where the light shaping element 12 includes an optical scanner, the linear light L0 output from the light source 11 in the Z direction is optically scanned in the X direction to form the planar light L1. According to the above definition, the irradiation surface R of the planar light L1 with respect to the sample S is a surface in the XZ plane. The depth direction of the sample S corresponds to the Z direction. The scanning direction of the container 13 by the stage 14 corresponds to the Y direction. When the bidirectional scanning is performed, the first direction is the +Y direction, and the second direction is the −Y direction. An operation of moving the container 13 in the X direction may be performed between scanning in the first direction and scanning in the second direction.

The imaging optical system 4 is an optical system that images the observation light L2 generated in the sample S by irradiation with the planar light L1. The imaging optical system 4 includes, for example, an objective lens 15, a filter switching unit 16, and an imaging lens 17. The filter switching unit 16 is a filter wheel used for multi-wavelength measurement of the sample S, and holds a first filter 18A and a second filter 18B. The filter switching unit 16 is disposed on an imaging optical path between the objective lens 15 and the imaging lens 17, and causes any one of the first filter 18A and the second filter 18B to be disposed on the imaging optical path. The first filter 18A and the second filter 18B transmit a part of the observation light L2 (for example, fluorescence of a specific wavelength) according to optical characteristics thereof.

The optical axis of the imaging optical system 4 is an observation axis P2 of the observation light L2. In the present embodiment, the observation axis P2 is inclined at a predetermined angle θ with respect to the irradiation surface R of the planar light L1. The angle θ also coincides with an angle formed by the optical axis P1 and the observation axis P2 of the planar light L1. The angle θ is, for example, 10° to 80°. From the viewpoint of improving the resolution of the observation image, the angle θ may be 20° to 70°. The angle θ may be 30° to 65° from the viewpoint of improving the resolution of the observation image and the stability of the visual field.

The observation axis P2 is not necessarily inclined with respect to the irradiation surface R of the planar light L1. That is, the observation axis P2 may be orthogonal to the irradiation surface R of the planar light L1 (the optical axis P1 of the planar light L1).

Figure 2:
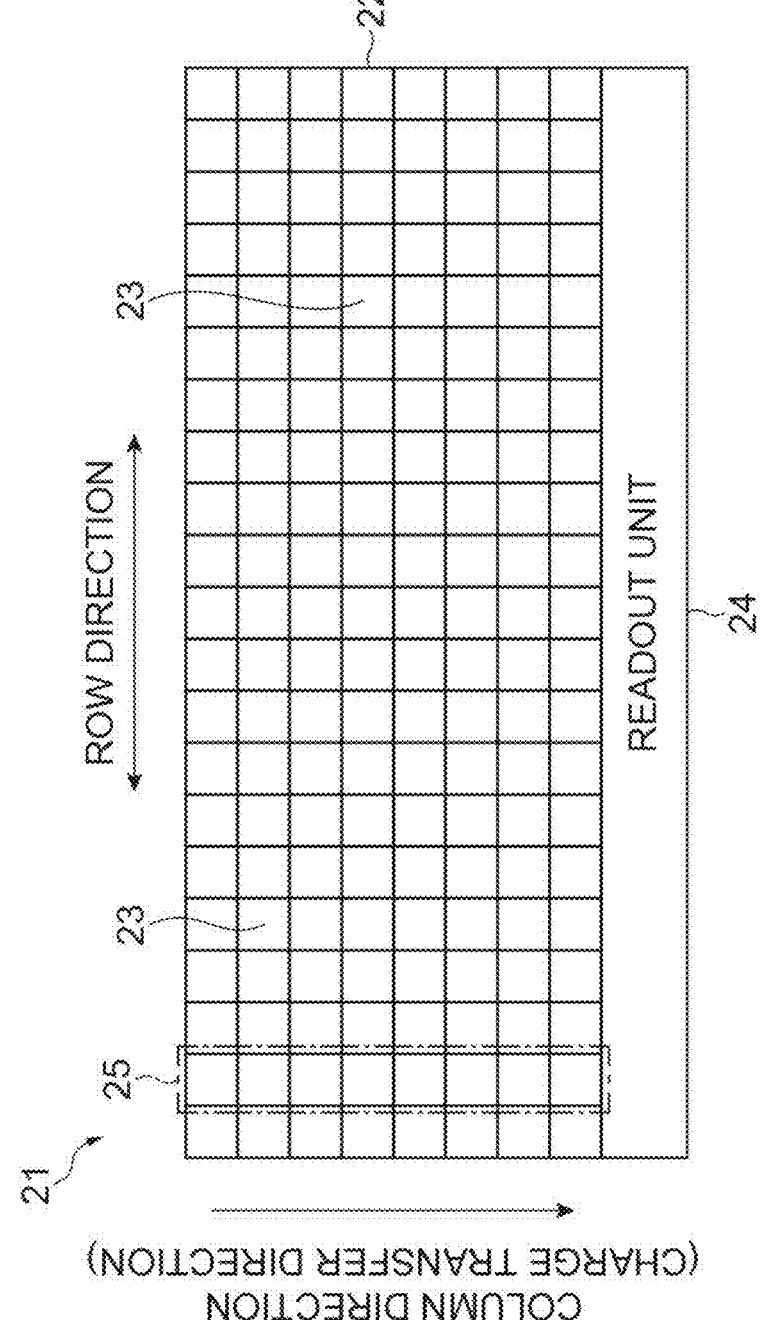
FIG. 2 is a schematic diagram illustrating a capturing region of an image capturing unit.

The image capturing unit 5 is a part that captures the observation light L2 generated in the sample S by irradiation with the planar light L1. The image capturing unit 5 include an area image sensor 21 such as a CMOS image sensor and a CCD image sensor, for example. The area image sensor 21 is disposed on the imaging plane of the imaging optical system 4. For example, as illustrated in FIG. 2, the area image sensor 21 includes a pixel region 22 including a plurality of pixels 23, and a readout unit 24 that externally reads out charge accumulated in each pixel 23 out. The area image sensor 21 captures an optical image of the observation light L2 by a rolling shutter method in which the start of the exposure periods of the pixel columns 25 in the pixel region 22 (see FIG. 2) is shifted by predetermined time, and generates image data based on the capturing result.

The control unit 6 physically includes a memory such as a RAM and a ROM, a processor such as a CPU, a communication interface, a storage unit such as a hard disk, a display, and the like. Configuration examples of the control unit 6 include a personal computer, a cloud server, and a smart device (smartphone, tablet terminal). The control unit 6 functions as an operation control unit 7 that controls the operations of the light source 11, the light shaping element 12, the stage 14, the filter switching unit 16, and the image capturing unit 5 by executing a program stored in the memory by a processor such as a CPU.

The control unit 6 as the operation control unit 7 receives an input of operation of starting measurement by the user, and drives the light source 11, the stage 14, the filter switching unit 16, and the image capturing unit 5. In addition, output conditions (wavelength or the like) of the light L0 by the light source 11, scanning conditions (scanning speed or the like) of the sample S by the stage 14, and image capturing conditions (exposure period, resolution, etc.) by the image capturing unit 5 are controlled according to settings input in advance. In a case where the light shaping element 12 includes an optical scanner, the operation control unit 7 controls the operation of the optical scanner of the light shaping element 12.

A control unit 6 may control the irradiation optical system 2 so that the sample S is irradiated with the planar light L1 having different wavelengths between the period in which the scanning unit 3 scans the sample S in the first direction and the period in which the scanning unit 3 scans the sample S in the second direction. The control unit 6 may control the scanning unit 3 so that the sample S is scanned with respect to the irradiation surface R of the planar light L1 at different scanning speed V1 and V2 between the period in which the scanning unit 3 scans the sample S in the first direction and the period in which the scanning unit 3 scans the sample S in the second direction. The control unit 6 may control the image capturing unit 5 so that roll times Tr (see FIG. 3A) represented by the time differences in the start of the exposure periods T in the pixel columns 25 are different from each other between the period in which the scanning unit 3 scans the sample S in the first direction and the period in which the scanning unit 3 scans the sample S in the second direction.

The control unit 6 also functions as a generation unit 8 that generates observation image data of the sample S on the basis of the image data generated in the image capturing unit 5, and analysis unit 9 that analyzes the sample S on the basis of the observation image data. The observation image data is, for example, two-dimensional image data (cross-sectional image) of the sample S on a plane (XZ plane) orthogonal to the optical axis P1 of the planar light L1. The control unit 6 as the generation unit 8 combines these cross-sectional images in the scanning direction (Y direction) of the sample S to generate three-dimensional information of the sample S. The control unit 6 as the analysis unit 9 analyzes the sample S on the basis of the generated observation image data to generate an analysis result. The analysis result is displayed on the display as necessary and stored in the storage unit.

Next, an image capturing method of the image capturing unit 5 in the sample observation device 1 will be described in more detail.

Figure 3A:
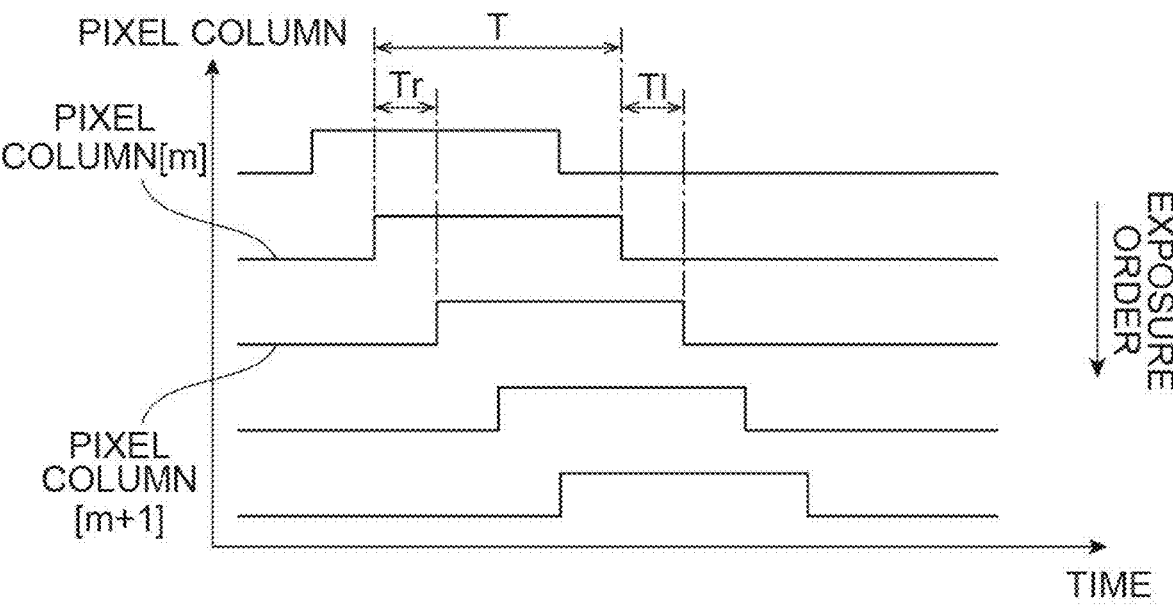
FIG. 3A is a schematic diagram illustrating exposure periods of pixels according to a general rolling shutter method.

As described above, the image capturing unit 5 in the sample observation device 1 includes the area image sensor 21 such as a CMOS image sensor or a CCD image sensor, and the rolling shutter method is adopted as the image capturing method. In general, in the rolling shutter method, as illustrated in FIG. 3A, the start of the exposure periods T of the pixel columns 25 in the pixel region 22 is shifted by predetermined time. That is, after a predetermined time has elapsed since the exposure of one pixel column 25 was instructed, the exposure of the next pixel column 25 is started, and then the exposure period T is sequentially started until the desired pixel column 25 is reached.

Figure 3B:
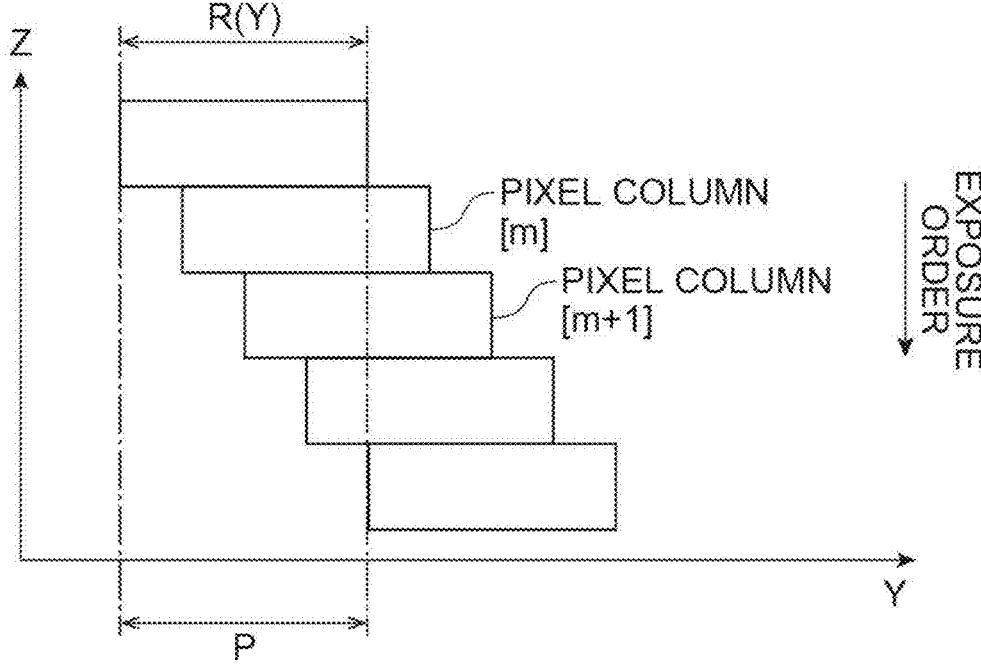
FIG. 3B is a schematic diagram illustrating exposure positions of pixels in a scanning direction according to a general rolling shutter method.

The time difference in the start of the exposure periods T in the pixel columns 25 is referred to as roll time Tr and is a parameter that can be controlled by the control unit 6. As illustrated in FIG. 3B, the resolution R(Y) in the Y direction in each pixel column 25 can be calculated based on the product of the exposure period T and the scanning speed V of the sample S. The shift amount of the exposure position P of each pixel column 25 is proportional to the scanning speed V of the sample S at the time of image capturing.

In image capturing by the general rolling shutter method, each frame includes an exposure period and a readout period. The time difference in the start of the readout period in each pixel column 25 is referred to as line time Tl (see FIG. 3A). The line time Tl is a parameter that can be controlled by the control unit 6, similarly to the roll time Tr. In the present embodiment, the roll time Tr and the line time Tl are set to equal values. Furthermore, in general, in a predetermined frame, after the exposure period T of a predetermined pixel column 25 has elapsed, the readout period of the pixel column 25 is started at the end of the exposure. Then, after the elapse of the readout period of the predetermined pixel column 25 in the predetermined frame, the exposure of the predetermined pixel column 25 in the next frame is started at the end of the readout.

In the present embodiment, various image capturing modes by the rolling shutter method can be applied. For example, the image capturing unit 5 may perform an image capturing by the rolling shutter method in an image capturing mode in which starting the exposure is controlled on the basis of a trigger signal. The image capturing unit 5 may perform an image capturing by the rolling shutter method in an image capturing mode in which starting the exposure and the exposure period are controlled on the basis of a trigger signal. The image capturing unit 5 may perform an image capturing by the rolling shutter method in an image capturing mode in which starting the readout is controlled on the basis of a trigger signal. The image capturing unit 5 may perform an image capturing by the rolling shutter method in an image capturing mode in which starting the readout and the readout period are controlled on the basis of a trigger signal.

The trigger signal for controlling the image capturing by the rolling shutter method can be set by, for example, an external trigger signal. For example, the external trigger signal may be a trigger signal output from a linear encoder that detects the position of the stage 14. In this case, the linear encoder outputs the trigger signal every time the stage 14 moves by a predetermined distance in the Y direction. The image capturing unit 5 controls the exposure period and/or the readout period in the image capturing by the rolling shutter method according to the image capturing mode on the basis of the external trigger signal to be input, and executes exposure and readout of the (n+1)th frame following the exposure and readout of the nth frame.

Figure 4:
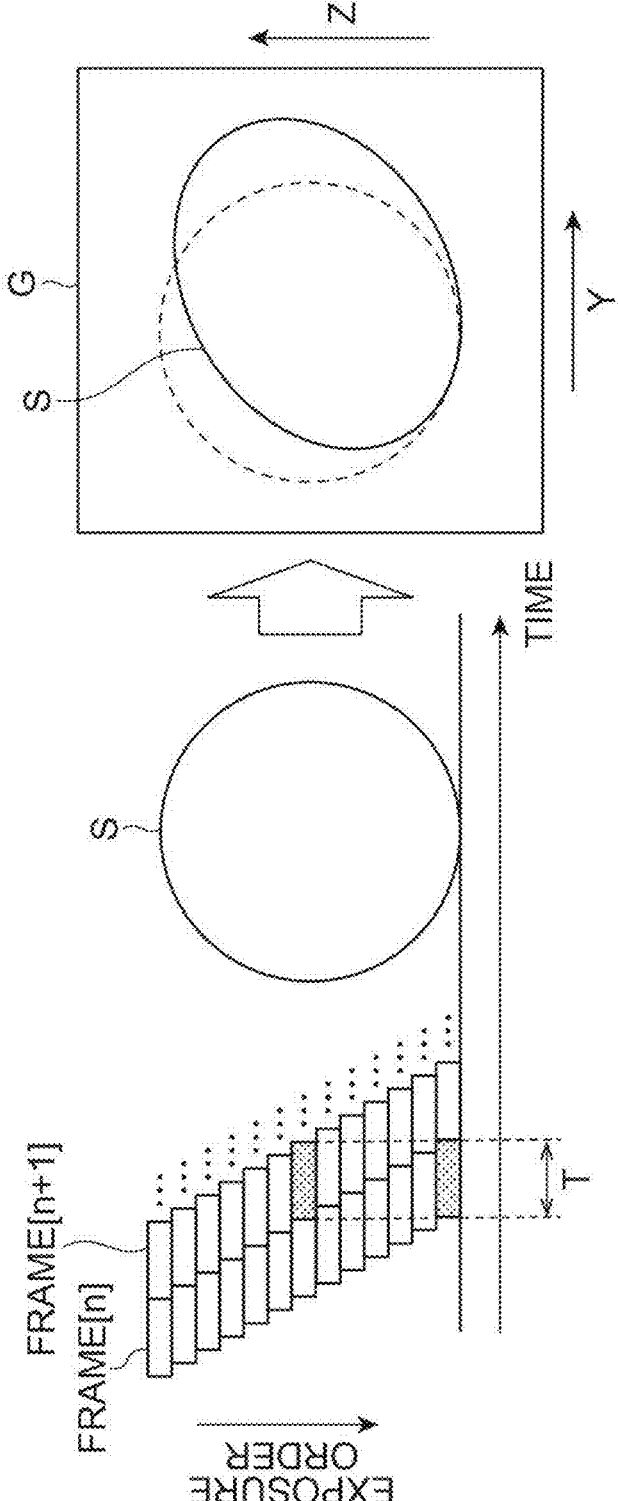
FIG. 4 is a schematic view illustrating a state of acquisition of an image of a sample.

FIG. 4 illustrates the relationship between the shift amount of the exposure position P and the imaged figure of the sample S in the obtained image data. The example of FIG. 4 is a schematic diagram illustrating a state of acquisition of an imaged figure of the sample S in a period for scanning in the Y direction. As illustrated in the drawing, in image capturing the sample S in the period for scanning in the Y direction, exposure is performed by each pixel column 25 in the order of the nth frame, the (n+1)th frame, and so on.

The exposure order of the pixel columns 25 in each frame is arranged, for example, from a smaller column number to a larger column number. That is, the exposure period T of the pixel column 25 in the mth column is temporally earlier than the exposure period T of the pixel column 25 in the (m+1)th column by the roll time Tr. In the image data acquired in this state, due to the influence of the image capturing by the rolling shutter method and the movement of the stage 14, the exposure position P of the sample S corresponding to the exposure period T gradually shifts in the Y direction with respect to the position in the Z direction. Therefore, an imaged figure of the sample S is distorted in the Y direction with respect to the position in the Z direction (depth direction), with respect to the original existing position of the sample S.

When the exposure position P of the sample S gradually shifts in the Y direction with respect to the position in the Z direction, depending on the shift amount, an image that should originally exist in one frame may be recognized as an image that exists in an adjacent frame. That is, an imaged figure of the sample S at a certain exposure position P in one frame can be recognized as an imaged figure of the sample S at the same exposure position P in a frame adjacent to the one frame. Such a shift in image recognition may cause a decrease in the accuracy of analysis of the shape and the existing position of the sample S.

In view of such a problem, in the present embodiment, the image data obtained by image capturing by the rolling shutter method is not used as it is, but is reconstructed into image data equivalent to image data obtained by the global shutter method, thereby reducing the distortion of an imaged figure of the sample S in the image data.

Figure 5:
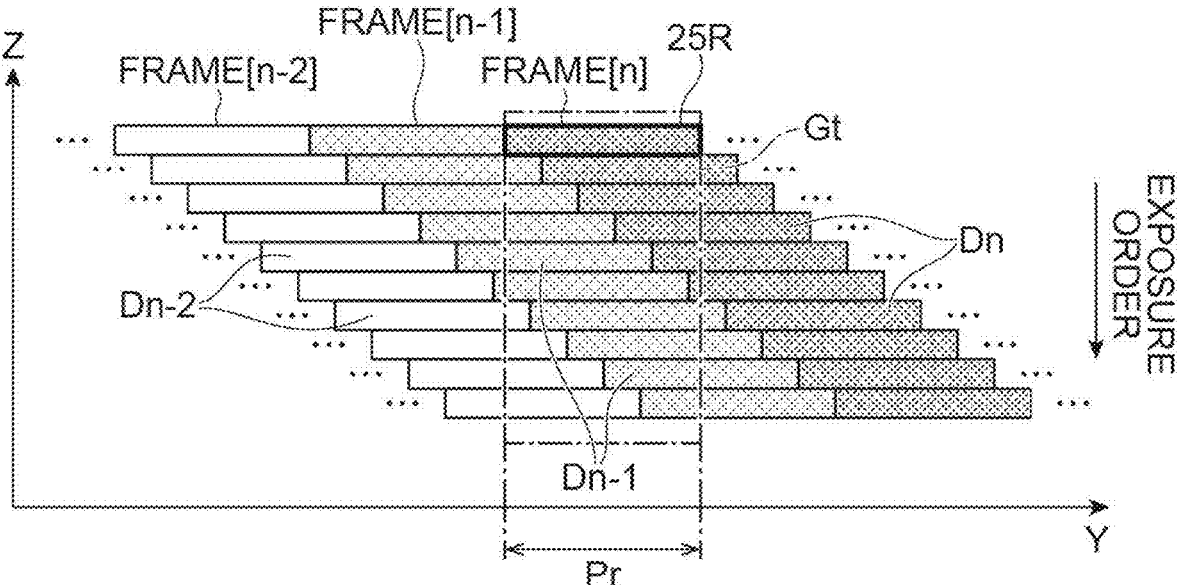
FIG. 5 is a schematic diagram illustrating an example of image data reconstruction.

More specifically, in the present embodiment, as illustrated in FIG. 5, the generation unit 8 sets one pixel column 25 among the pixel columns 25 as a reference pixel column 25R. Based on the set reference pixel column 25R, the generation unit 8 combines a data portion D corresponding to the exposure position P of the reference pixel column 25R among the exposure positions P of the pixel columns 25 of one frame, and a data portion D corresponding to the exposure position P of the reference pixel column 25R among the exposure positions P of the pixel columns 25 of frames consecutive to the one frame (hereinafter, the exposure position P of the reference pixel column 25R is referred to as a "reference exposure position Pr"). Then, the generation unit 8 generates two-dimensional image data Gt corresponding to the reference exposure position Pr in the one frame by combining the data portions D.

In the example of FIG. 5, the generation unit 8 sets the first pixel column 25 to be an array end of the pixel region 22 as the reference pixel column 25R. In this example, in generating the two-dimensional image data Gt corresponding to the reference exposure position Pr, the data portion $D_n$ acquired in the nth frame, the data portion $D_{n-1}$ acquired in the (n−1)th frame, and the data portion $D_{n-2}$ acquired in the (n−2)th frame are used.

In the first pixel column 25 which is the reference pixel column 25R, 100% of the image data G acquired in the nth frame is used for generating the two-dimensional image data Gt. That is, in the reference pixel column 25R, only the data portion $D_n$ is used for generating the two-dimensional image data Gt. As the arrangement order the pixel column 25 is farther from the reference pixel column 25R, the combination ratio of the data portion $D_n$ gradually decreases, and the combination ratio of the data portion $D_{n-1}$ gradually increases.

In the example of FIG. 5, for the second to sixth pixel columns 25, the data portion $D_n$ acquired in the nth frame and the data portion $D_{n-1}$ acquired in the (n−1)th frame are used for generating the two-dimensional image data Gt. In the second and third pixel columns 25, the combination ratio of the data portion $D_n$ is higher than the combination ratio of the data portion $D_{n-1}$, and in the fourth to sixth pixel columns 25, the combination ratio of the data portion $D_{n-1}$ is higher than the combination ratio of the data portion $D_n$.

For the seventh to tenth pixel columns 25, the data portion $D_{n-1}$ acquired in the (n−1)th frame and the data portion $D_{n-2}$ acquired in the (n−2)th frame are used for generating the two-dimensional image data Gt. In the seventh and eighth pixel columns 25, the combination ratio of the data portion $D_{n-1}$ is higher than the combination ratio of the data portion $D_{n-2}$, and in the ninth pixel column 25, the combination ratio of the data portion $D_{n-1}$ and the combination ratio of the data portion $D_{n-2}$ are substantially the same. In the ninth and tenth pixel columns 25, the combination ratio of the data portion $D_{n-2}$ is higher than the combination ratio of the data portion $D_{n-1}$.

Figure 6:
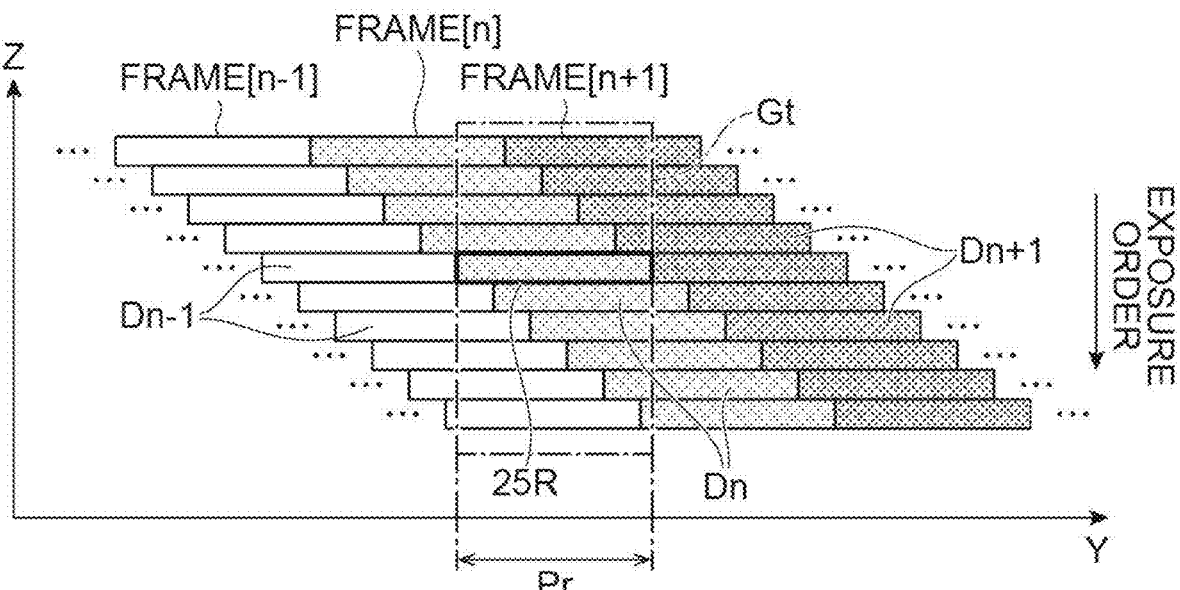
FIG. 6 is a schematic diagram illustrating another example of image data reconstruction.

In addition, as illustrated in FIG. 6, the generation unit 8 may set an intermediate pixel column of the pixel region 22 as the reference pixel column 25R. The intermediate pixel column is the pixel column 25 excluding the array end among the pixel columns 25 included in the pixel region 22. In the example of FIG. 6, the generation unit 8 sets the fifth pixel column 25 as the reference pixel column 25R. In this example, in generating the two-dimensional image data Gt corresponding to the reference exposure position Pr, the data portion $D_n$ acquired in the nth frame, the data portion $D_{n+1}$ acquired in the (n+1)th frame, and the data portion $D_{n-1}$ acquired in the (n−1)th frame are used.

In the fifth pixel column 25 which is the reference pixel column 25R, 100% of the image data acquired in the nth frame is used for generating the two-dimensional image data Gt. That is, in the reference pixel column 25R, only the data portion $D_n$ is used for generating the two-dimensional image data Gt. As the arrangement order of the pixel column 25 is farther from the reference pixel column 25R, the combination ratio of the data portion $D_n$ gradually decreases, and the combination ratio of the data portion $D_{n+1}$ or the data portion $D_{n-1}$ gradually increases.

In the example of FIG. 6, for the first to fourth pixel columns 25, the data portion $D_n$ acquired in the nth frame and the data portion $D_{n+1}$ acquired in the (n+1)th frame are used for generating the two-dimensional image data Gt. In the third and fourth pixel columns 25, the combination ratio of the data portion $D_n$ is higher than the combination ratio of the data portion $D_{n+1}$, and in the first to second pixel columns 25, the combination ratio of the data portion $D_{n+1}$ is higher than the combination ratio of the data portion $D_n$.

For the sixth to tenth pixel columns 25, the data portion $D_n$ acquired in the nth frame and the data portion $D_{n-1}$ acquired in the (n−1)th frame are used for generating the two-dimensional image data Gt. In the sixth and seventh pixel columns 25, the combination ratio of the data portion $D_n$ is higher than the combination ratio of the data portion $D_{n-1}$, and in the eighth to tenth pixel columns 25, the combination ratio of the data portion $D_{n-1}$ is higher than the combination ratio of the data portion $D_n$.

The combination ratio of the data portion D can be calculated using the scanning conditions of the sample S by the scanning unit 3 and the image capturing conditions of the observation light L2 by the image capturing unit 5. In the present embodiment, the generation unit 8 calculates a combination ratio of the data portions D on the basis of roll time Tr represented by a time difference of a start of the exposure period T in each of the pixel columns 25, the scanning speed V of the sample S by the scanning unit 3, and resolution R(Y) of the image capturing unit 5.

Figure 7:
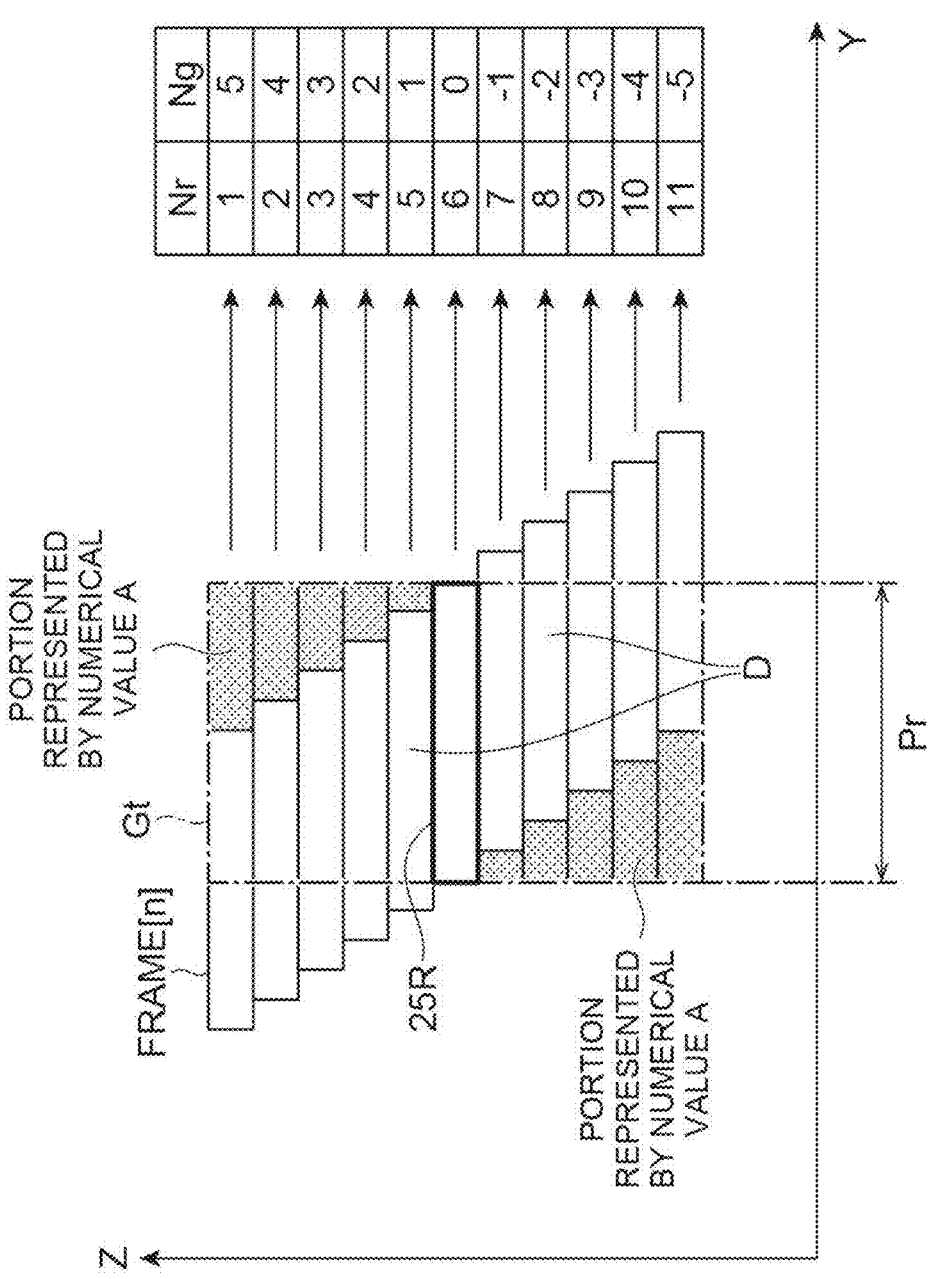
FIG. 7 is a schematic diagram illustrating calculation of a combination ratio of data portions.

For example, the following Formula (1) or Formula (2) is used to calculate the combination ratio. As illustrated in FIG. 7, the portion represented by the numerical value A indicates a ratio of a portion corresponding to the data portion D acquired in a frame before or after one frame in the image data G of each pixel column 25 corresponding to the reference exposure position Pr. When the gap number Ng is larger than 0, Formula (1) is used for the frame including the portion represented by the numerical value A. On the other hand, when the gap number Ng is smaller than 0, Formula (2) is used for the frame including the portion represented by the numerical value A. The frame including the portion represented by the numerical value A is not limited to the preceding and following frames continuous to the one frame, and may be a frame two or more frames before or two or more frames after the one frame.

$$A[/\text{line}] = \tag{1}$$

$$((\text{gap number } Ng \times \text{roll time } Tr \times \text{scanning speed } V)/\text{resolution } R(Y)) + 1$$

$$A[/\text{line}] = \tag{2}$$

$$((\text{gap number } Ng \times \text{roll time } Tr \times \text{scanning speed } V)/\text{resolution } R(Y)) - 1$$

The gap number Ng is a value indicating the number of pixel columns from the reference pixel column 25R when the reference pixel column 25R is set to 0. When the column number of the pixel column 25 is N and the column number of the reference pixel column 25R is Nr, the gap number Ng can be calculated by Ng=N−Nr (see FIG. 7). Note that the order of the pixel columns read by the rolling shutter method may be defined as the column number Nr of the reference pixel column 25R. In this way, even when the reading direction of the rolling shutter is changed, the gap number Ng can be calculated by the same calculation. In calculating the combination ratio, A is calculated for each gap number Ng. An integer part f of the value of A indicates the number of a frame used for combination. In a case where the number of the frame set with the reference pixel column 25R is n, the data portion D acquired in the (n+f)th frame is used for combination. The absolute value of the fractional part d of the value of A indicates the ratio of the data portion D acquired in the (n+f)th frame. The absolute value of the fractional part d is converted into the ratio of the data portion D with 1=100%.

In the reference pixel column 25R, the gap number Ng is 0, and the value of A calculated by Formula (1) is 1. In this case, since the integer part f is 1, the data portion D acquired in the (n+1)th frame is used for combining in the expression, but since the absolute value of the fractional part d is 0, the ratio of the data portion D acquired in the (n+1)th frame is 0%. Therefore, in the reference pixel column 25R, 100% of the data portion D of the nth frame is used.

In the pixel column 25 other than the reference pixel column 25R, for example, in a case where the value of A calculated by the expression (1) is 1.109, since the integer part f is 1, the data portion D acquired in the (n+1)th frame is used for combining. In addition, since the absolute value of the fractional part d is 0.109, the ratio of the data portion D acquired in the (n+1)th frame is 10.9%. Therefore, for this pixel column 25, 89.1% of the data portion D acquired in the nth frame and 10.9% of the data portion D acquired in the (n+1)th frame are combined.

In the pixel column 25 other than the reference pixel column 25R, for example, in a case where the value of A calculated by the expression (2) is −1.109, since the integer part f is −1, the data portion D acquired in the (n−1)th frame is used for combining. In addition, since the absolute value of the fractional part d is 0.109, the ratio of the data portion D acquired in the (n−1)th frame is 10.9%. Therefore, for this pixel column 25, 89.1% of the data portion D acquired in the nth frame and 10.9% of the data portion D acquired in the (n−1)th frame are combined.

Figure 8:
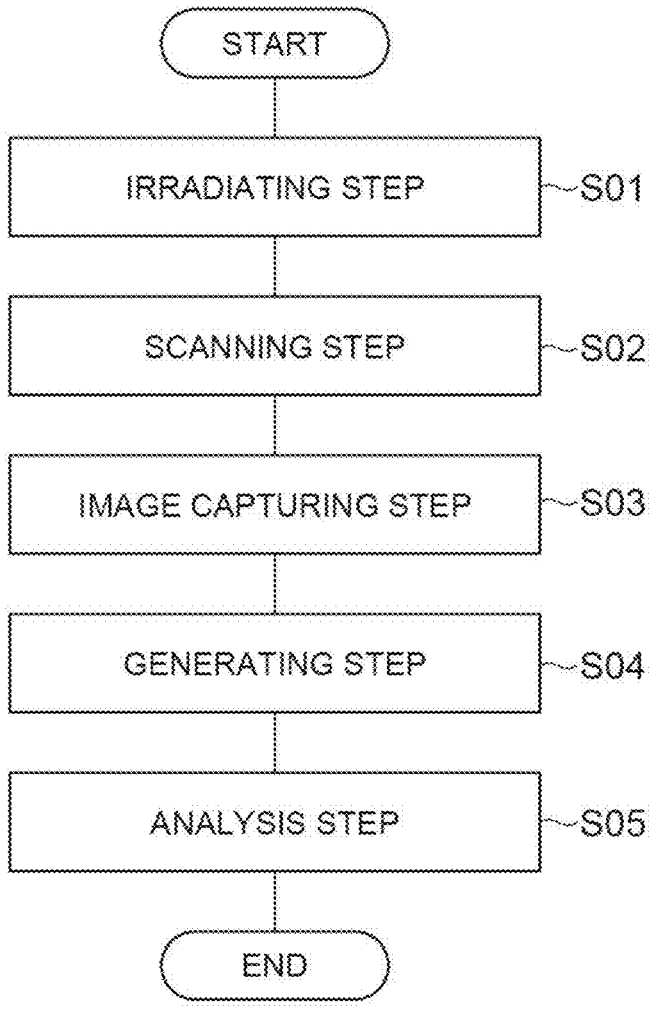
FIG. 8 is a flowchart illustrating a sample observation method according to an embodiment of the present disclosure.

FIG. 8 is a flowchart illustrating a sample observation method according to an embodiment of the present disclosure. As illustrated in the drawing, the sample observation method includes an irradiating step S01, a scanning step S02, an image capturing step S03, a generating step S04, and an analysis step S05.

The irradiating step S01 is a step that irradiates the sample S with the planar light L1. In the irradiating step S01, the light L0 output from the light source 11 is shaped into planar light L1, and the sample S held in the container 13 is irradiated with the planar light L1. The observation light L2 based on the irradiation of the planar light L1 is generated from the sample S. The scanning step S02 is a step that scans the sample S with respect to the irradiation surface R of the planar light L1. Here, the sample S is scanned in the Y direction by the stage 14.

The image capturing step S03 is a step of image capturing the observation light L2 generated in the sample S by the irradiation of the planar light L1 and outputting the image data G based on the capturing result. In the image capturing step S03, using the area image sensor 21 that performs image capturing by the rolling shutter method in which the start of the exposure period T of each pixel column 25 in the pixel region 22 is shifted by predetermined time, the image data G based on the capturing result of the sample S being scanned is output.

The generating step S04 is a step of generating the two-dimensional image data Gt at each position in the scanning direction of the sample S on the basis of the image data G acquired in the image capturing step S03. In generating step S04, one pixel column 25 among the pixel columns 25 is set as the reference pixel column 25R. Then, in the generating step S04, the data portion D corresponding to the reference exposure position Pr of one frame and the data portion D corresponding to the reference exposure position Pr of the frame continuous to the one frame are combined to generate the two-dimensional image data Gt corresponding to the reference exposure position Pr.

The analysis step S05 is a step of analyzing the sample S. In the analysis step S05, observation image data of the sample S is generated on the basis of the two-dimensional image data Gt obtained in the generating step S04, the sample S is analyzed on the basis of the generated observation image data, and an analysis result is generated.

As described above, in the sample observation device 1, in generating two-dimensional image data Gt of the sample S, one pixel column 25 of the pixel columns 25 is set as the reference pixel column 25R, and the data portions D corresponding to the reference exposure positions Pr are combined between consecutive frames. As a result, image data G obtained by image capturing by the rolling shutter method is reconstructed into the image data G equivalent to image data obtained by the global shutter method, and distortion of an imaged figure of the sample S in the image data G can be reduced. By reducing the distortion of the imaged figure of the sample S, it is possible to prevent the imaged figure of the sample S of one frame from being recognized as the imaged figure of the sample S of the adjacent frame, and it is possible to sufficiently ensure the analysis accuracy of the shape and the existing position of the sample S.

In the present embodiment, the generation unit 8 can set the pixel column 25 to be an array end of the pixel region 22 as the reference pixel column 25R. In this case, the control required for generating the two-dimensional image data Gt can be simplified.

Figures 9A, 9B, 9C:
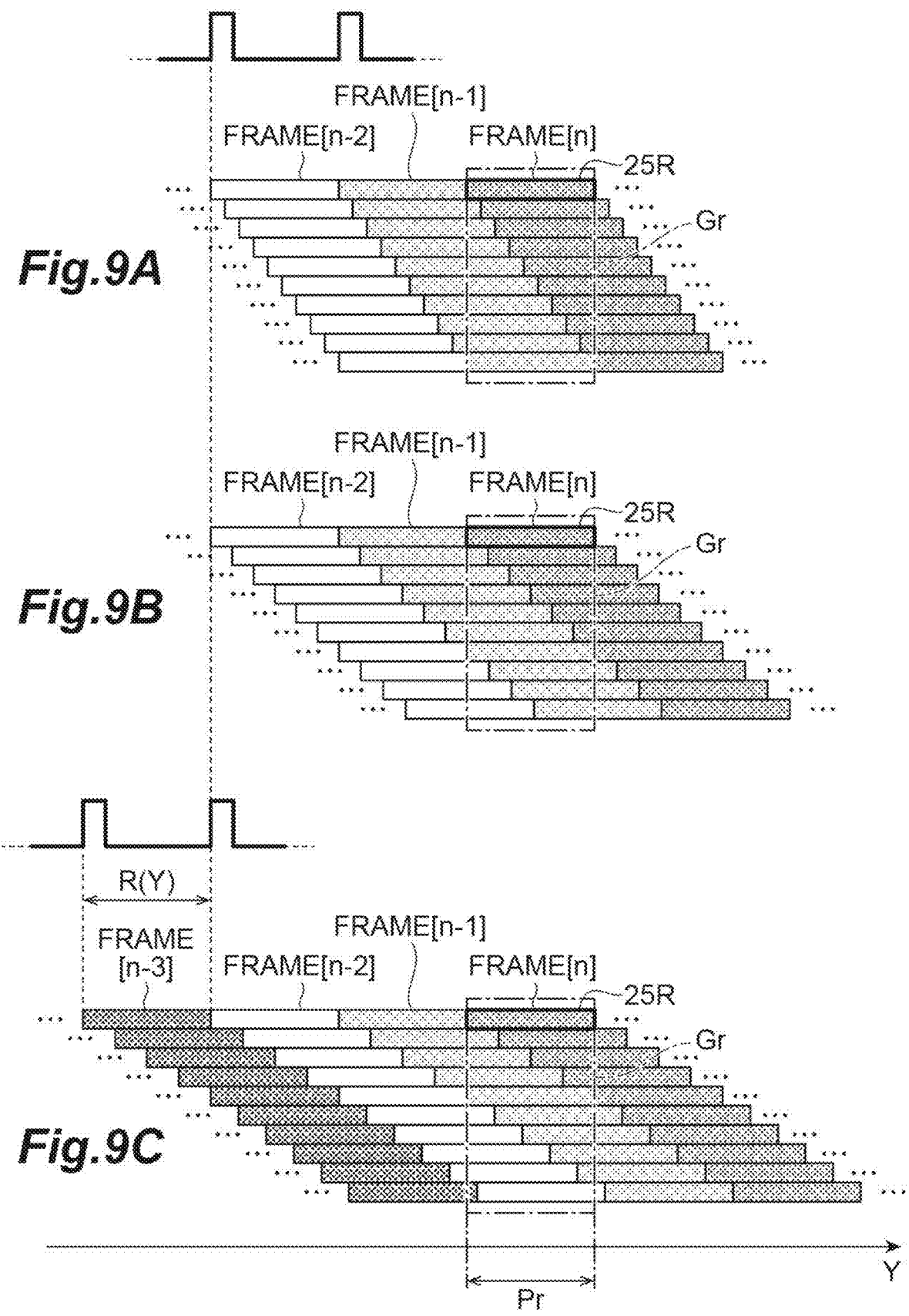
FIG. 9A is a schematic diagram illustrating a setting example of a trigger signal.
FIG. 9B is a schematic diagram illustrating a setting example of a trigger signal.
FIG. 9C is a schematic diagram illustrating a setting example of a trigger signal.

Specifically, in a case where the pixel column 25 to be the array end of the pixel region 22 is set as the reference pixel column 25R, as illustrated in FIG. 9A, in generating the two-dimensional image data Gt corresponding to the reference exposure position Pr, the data portion D of one frame and the data portion D of the previous frame of the one frame may be combined. Therefore, as illustrated in FIG. 9B, even when the scanning speed V is changed from the state of FIG. 9A, for example, an increase in the number of changes in the timing of the trigger signal from the linear encoder can be avoided. In addition, as illustrated in FIG. 9C, even in a case where the number of frames used for combining the data portions D increases due to a change in the scanning condition or the image capturing condition, the trigger signal may be output at a timing shifted by the resolution R(Y).

In the present embodiment, the generation unit 8 can set an intermediate pixel column of the pixel region 22 as the reference pixel column 25R. According to this technique, even when the sample S is bidirectionally scanned, the measurement range can be made the same regardless of the scanning direction.

In the present embodiment, the generation unit 8 calculates a combination ratio of the data portions D on the basis of roll time Tr represented by a time difference of a start of the exposure period T in each of the pixel columns 25, the scanning speed V of the sample S by the scanning unit 3, and resolution R(Y) of the image capturing unit 5. The combining is optimized by calculating the combination ratio of the data portions D in consideration of the scanning conditions and the image capturing conditions.

What is claimed is:

1. A sample observation device comprising:
an irradiation optical system configured to irradiate a sample with planar light;
a scanner configured to scan the sample in a direction orthogonal to an irradiation surface of the planar light;
an image capturer configured to include a pixel region for image capturing observation light generated in the sample by irradiation of the planar light to output image data based on a capturing result of the observation light in the pixel region;

a generator configured to generate two-dimensional image data at each position in a scanning direction of the sample on the basis of the image data; and a linear encoder that outputs a trigger signal each time the scanner moves only by a predetermined distance, wherein the image capturer includes an area image sensor that performs image capturing by a rolling shutter method in which a start of an exposure period of each of pixel columns in the pixel region is shifted by predetermined time, the image capturer controls the exposure period in the image capturing by the rolling shutter method, based on the trigger signal, and the generator sets one pixel column of the pixel columns as a reference pixel column, and combines a data portion corresponding to an exposure position of the reference pixel column among exposure positions of pixel columns of one frame and a data portion corresponding to an exposure position of the reference pixel column among exposure positions of pixel columns of other frames continuous to the one frame, thereby generating two-dimensional image data corresponding to an exposure position of the reference pixel column in the one frame.

2. The sample observation device according to claim 1, wherein the generator sets a pixel column to be an array end of the pixel region as the reference pixel column.

3. The sample observation device according to claim 1, wherein the generator sets an intermediate pixel column of the pixel region as the reference pixel column.

4. The sample observation device according to claim 1, wherein the generator calculates a combination ratio of the data portions on the basis of roll time represented by a time difference of a start of an exposure period in each of the pixel columns, a scanning speed of the sample by the scanner, and resolution of the image capturer.

5. A sample observation method comprising:

irradiating a sample with planar light;

scanning the sample in a direction orthogonal to an irradiation surface of the planar light;

image capturing by using a pixel region for image capturing observation light generated in the sample by irradiation of the planar light to output image data based on a capturing result of the observation light in the pixel region;

generating two-dimensional image data at each position in a scanning direction of the sample on the basis of the image data; and outputting a trigger signal with a linear encoder each time the scanning moves only by a predetermined distance, wherein the image capturing uses an area image sensor that performs image capturing by a rolling shutter method in which a start of an exposure period of each of pixel columns in the pixel region is shifted by predetermined time, the image capturing controls the exposure period in the image capturing by the rolling shutter method, based on the trigger signal, and the generating sets one pixel column of the pixel columns as a reference pixel column, and combines a data portion corresponding to an exposure position of the reference pixel column among exposure positions of pixel columns of one frame and a data portion corresponding to an exposure position of the reference pixel column among exposure positions of pixel columns of other frames continuous to the one frame, thereby generating two-dimensional image data corresponding to an exposure position of the reference pixel column in the one frame.

6. The sample observation method according to claim 5, wherein the generating sets a pixel column to be an array end of the pixel region as the reference pixel column.

7. The sample observation method according to claim 5, wherein the generating sets an intermediate pixel column of the pixel region as the reference pixel column.

8. The sample observation method according to claim 5, wherein the generating calculates a combination ratio of the data portions on the basis of roll time represented by a time difference of a start of an exposure period of each of the pixel columns, a scanning speed of the sample in the scanning, and resolution in the image capturing.

* * * * *